(12) United States Patent
Kretzschmar et al.

(10) Patent No.: US 10,487,872 B2
(45) Date of Patent: Nov. 26, 2019

(54) ROLLING BEARING ARRANGEMENT, IN PARTICULAR FOR A SWITCHING DEVICE FOR SWITCHING A MANUAL TRANSMISSION

(71) Applicant: GM GLOBAL TECHNOLOGY OPERATIONS LLC, Detroit, MI (US)

(72) Inventors: Ulrich Kretzschmar, Bad Kreuznach (DE); David Pinto Curiel, Ginsheim-Gustavsburg (DE); Robert Roessner, Frankfurt (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/030,577

(22) Filed: Jul. 9, 2018

(65) Prior Publication Data

US 2019/0010978 A1  Jan. 10, 2019

(30) Foreign Application Priority Data

Jul. 8, 2017  (DE) .................. 10 2017 006 495

(51) Int. Cl.
| | |
|---|---|
| *F16C 19/08* | (2006.01) |
| *F16H 63/30* | (2006.01) |
| *F16C 33/38* | (2006.01) |
| *F16C 31/04* | (2006.01) |
| *F16H 61/00* | (2006.01) |

(Continued)

(52) U.S. Cl.
CPC .............. *F16C 19/08* (2013.01); *F16C 31/04* (2013.01); *F16C 33/3806* (2013.01); *F16C 33/3887* (2013.01); *F16C 33/40* (2013.01); *F16H 63/30* (2013.01); *F16H 61/00* (2013.01);

(Continued)

(58) Field of Classification Search
CPC .......... F16C 19/02; F16C 19/08; F16C 31/04; F16C 33/40; F16C 33/3806; F16C 33/3843; F16C 33/3887; F16H 57/04; F16H 61/00; F16H 63/30; F16H 63/32; F16H 2063/3076; F16H 2063/3079
USPC ......... 384/49, 510, 512, 515, 523, 490, 504; 74/473.25, 473.36
See application file for complete search history.

(56) References Cited

U.S. PATENT DOCUMENTS

| | | | | |
|---|---|---|---|---|
| 1,570,056 | A | * | 1/1926 | Fritz ...................... F16C 19/08 384/510 |
| 2,968,979 | A | * | 1/1961 | Aijala ................. B25B 23/1427 464/39 |

(Continued)

FOREIGN PATENT DOCUMENTS

| | | | | |
|---|---|---|---|---|
| CN | 201627906 U | * | 11/2009 | ............. F16H 57/04 |
| DE | 2718382 A1 | * | 11/1978 | ............. F16C 19/08 |

(Continued)

*Primary Examiner* — Marcus Charles
(74) *Attorney, Agent, or Firm* — Lorenz & Kopf, LLP (57) ABSTRACT

A rolling bearing arrangement is provided for a switching device for switching a manual transmission. The rolling bearing arrangement includes at least one rolling bearing having an outer shell, a cage axially displaceable in the outer shell, and a plurality of rolling elements guided by the cage and radially supported on the outer shell. A rod having a switch axis is supported rotatably and axially displaceably by the rolling elements. The rod has an axial stop for securing the cage in a form-fitting manner with vertically aligned rod in an upper position against a downward axial displacement.

11 Claims, 4 Drawing Sheets

(51) Int. Cl.
 *F16C 33/40* (2006.01)
 *F16H 63/20* (2006.01)
(52) U.S. Cl.
 CPC ...... *F16H 63/20* (2013.01); *F16H 2063/3076* (2013.01); *F16H 2063/3079* (2013.01)

(56) References Cited

U.S. PATENT DOCUMENTS

| | | | | |
|---|---|---|---|---|
| 3,043,634 | A * | 7/1962 | Coley | F16C 19/08 384/49 |
| 3,424,507 | A * | 1/1969 | Moroney | F16C 19/49 384/454 |
| 3,469,893 | A * | 9/1969 | Hudson | F16C 29/04 384/52 |
| 3,469,894 | A * | 9/1969 | Stamm | F16C 29/04 384/30 |
| 7,487,693 | B2 * | 2/2009 | Kiene | F16H 63/30 74/473.25 |
| 2015/0128744 | A1 * | 5/2015 | Yi | F16H 63/30 74/473.36 |

FOREIGN PATENT DOCUMENTS

| | | | | |
|---|---|---|---|---|
| DE | 4025011 A1 * | 2/1992 | | F16C 29/04 |
| DE | 102006043332 A1 * | 3/2008 | | F16H 63/32 |
| DE | 102007006322 A1 * | 8/2008 | | F16C 31/04 |
| FR | 2441089 A1 * | 6/1980 | | B30B 15/041 |
| GB | 190911619 A * | 8/1909 | | F16C 19/08 |

\* cited by examiner

ROLLING BEARING ARRANGEMENT, IN PARTICULAR FOR A SWITCHING DEVICE FOR SWITCHING A MANUAL TRANSMISSION

CROSS-REFERENCE TO RELATED APPLICATION

This application claims priority to German Patent Application No. 10 2017 006 495.4, filed Jul. 8, 2017, which is incorporated herein by reference in its entirety.

TECHNICAL FIELD

The present disclosure relates to a rolling bearing arrangement, in particular for a switching device for switching a manual transmission, a switching device and a motor vehicle having the rolling bearing arrangement and a method for their assembly.

BACKGROUND

Switching devices for switching a motor vehicle manual transmission typically have a switch axis and a shift or blocker cylinder which is axially displaced on the switch axis to select different gears or shifting gates, and is rotated about the switch axis to engage or disengage selected gears.

For this purpose, the shift cylinder is supported by rolling bearings rotatably and axially displaceable on the switch axis. These rolling bearings each have an outer shell fixed to the shift cylinder and a cage which is axially displaceably received in the outer shell and guides a plurality of balls, which roll radially inward on the switch axis and radially outward on the outer shell and support them so as to be rotatable and axially displaceable on the switch axis.

From time to time the cage may sag downward within the outer shell in a lower/lowest position of the shift cylinder from its own weight and/or by vibration and/or switching actuation(s) or movement(s) due to part tolerances. If the shift cylinder is now to be displaced axially in a higher/highest position again, this requires increased actuating forces, since the balls do not roll here, but rather slide.

This can disadvantageously increase the operating forces to be applied by the driver and/or make it more difficult or even prevent an automatic reset, in particular into a neutral position, as well as correct switching operations.

SUMMARY

In accordance with the present disclosure, an improved rolling bearing arrangement is provided for a switching device in particular for an internal or gear-side or fixed switching device for switching a manual transmission for motor vehicle manual transmission to switch the manual transmission of the motor vehicle.

According to one embodiment of the present disclosure, a rolling bearing arrangement has at least one rolling bearing, which is also referred to herein as a first rolling bearing, and a rod, defining a switch axis of the switching device, which is rotatably and axially displaceably supported by or in the first rolling bearing.

In one embodiment, the rolling bearing arrangement has at least one further rolling bearing, which is also referred to herein as a second roller bearing, by which or in which the rod is also rotatably and axially displaceably supported. As a result, in one embodiment, the support of the rod can be improved.

In one embodiment, the switching device has a shift cylinder which is rotatably and axially, in particular limited, displaceably supported on the switch axis of the rolling bearing arrangement by the first rolling bearing and in a further development also by the second rolling bearing. This may be a particularly advantageous use of a rolling bearing arrangement according to one embodiment of the present disclosure, without this being limited thereto.

According to one embodiment of the present disclosure, the first rolling bearing has a first outer shell, a first cage, which is arranged or accommodated displaceably in the first outer shell axially, in particular limited, and a plurality of first rolling elements guided by the first cage in a form-fitting manner and/or axially and/or circumferentially, radially supported on the first outer shell, in particular rolling, which support the rod, in particular the switch axis, rotatably and axially, in particular limited, displaceably (relative to the first outer shell, in particular the shift cylinder to which in one embodiment the first outer shell is fastened or provided for this purpose, in particular set up), (for this purpose) roll on the rod or the switch axis in one embodiment. The first outer shell and/or the first cage may each include a single or multiple part or piece configurations. Accordingly, in one embodiment, the first rolling bearing is a so-called RLF bearing.

In one embodiment, the second rolling bearing has a second outer shell, a second cage, which is arranged or accommodated axially, in particular limited, displaceably in the second outer shell, and a plurality of second rolling elements guided by the second cage, in particular in a form-fitting manner and/or axially and/or circumferentially, radially supported on the second outer shell, in particular rolling, which support the rod, in particular the switch axis, (also) rotatably and axially, in particular limited, displaceably (relative to the second outer shell, in particular to the shift cylinder, to which in one embodiment the second outer shell is fastened or provided for this purpose, in particular set up), (for this purpose) roll on the rod or the switch axis in one embodiment. The second outer shell and/or the second cage may each include a single or multiple part or piece configurations. Accordingly, in one embodiment, the second rolling bearing is a so-called RLF bearing.

An axial direction is in one embodiment parallel to a longitudinal, in particular symmetry, and/or displacement axis of the first and/or second rolling bearing or the rod or the switch axis. A circumferential direction corresponds to a direction of rotation about this axis and/or the first or second rolling bearing. A radial direction corresponds to a direction perpendicular to the axial and circumferential direction.

According to an embodiment of the present disclosure, the rod has a first axial stop, which secures downward the first cage with vertically aligned rod or at least when the rod is vertical or its longitudinal or axial direction is aligned vertically or parallel to the direction of gravity, in a (vertical or in the direction of gravity) upper position in a form-fitting manner or by means of a (geometrical) form-fitting against an axial displacement (vertical or in the direction of gravity), or limits downward in a form-fitting manner an axial displacement or counteracts or opposes it, or the rolling bearing arrangement, in particular the first axial stop, is set up for this purpose or accordingly.

In this way, in one embodiment, an undesirable sagging of the first cage downward in a lower position of the shift cylinder, due to its own weight, in particular triggered and/or amplified by vibration and/or switching actuation(s) or movement(s), within the first outer shell, limits, in particular, at least substantially prevents, and thus in one embodiment, an undesirable complication of actuation and/or automatic return of the switching device can be reduced. Additionally or alternatively, in one embodiment, an actuating force for or during the axial displacement of the rod, at least substantially, is not affected, in particular is not increased by the, in one embodiment exclusively or only, form-fitting securing.

According to an embodiment of the present disclosure, the rod has a second axial stop, which secures downward the second cage with vertically aligned rod or (at least) when the rod is vertical or its longitudinal or axial direction is aligned vertically or parallel to the direction of gravity, in a (vertical or in the direction of gravity) upper position in a form-fitting manner or by means of a (geometrical) form-fitting against an axial displacement (vertical or in the direction of gravity), or limits downward in a form-fitting manner an axial displacement or counteracts or opposes it, or the rolling bearing arrangement, in particular the second axial stop, is set up for this purpose or accordingly.

In this way, in one embodiment, an undesirable sagging of the second cage downward, in particular, in a lower position of the shift cylinder, due to its own weight, in particular triggered and/or amplified by vibration and/or switching actuations(s) or movement(s), within the second outer shell, limits, in particular, at least substantially prevents, and thus in one embodiment, an undesirable complication of actuation and/or automatic return of the switching device can be reduced. Additionally or alternatively, in one embodiment, an actuating force for or during the axial displacement of the rod, at least substantially, is not affected, in particular is not increased by this further, in one embodiment exclusively or only, form-fitting securing.

The upper position in which the (first or second) axial stop in a form-fitting manner secures the (first or second) cage with vertically aligned rod is, in one embodiment, removed from a top (possible) position of the (first or second) cage at most 50%, in particular at most 25%, in particular at most 10% and in particular at most 5% of a maximum axial displacement path or stroke of the (first or second) cage. In one embodiment, the (first) cage is seated in the upper position on the (first) axial stop of the rod and/or the second cage in the upper position on the second axial stop of the rod, which in one embodiment thereby secures downward in a form-fitting manner against a (second) axial displacement.

In one embodiment, the rod has a one-piece or multiple-part, in particular completely or in sections cylindrical, base body on which the rolling elements and/or the second rolling elements radially prop up in one embodiment, in particular roll.

In one embodiment, the first axial stop is configured integrally with this base body. In another embodiment, the first axial stop is manufactured separately from the base body and, is arranged, in particular non-destructively detachable or not non-destructive detachable, in particular axially and/or rotationally fixed and/or form-fitting, frictionally engaged and/or firmly bonded, in particular by plugging on or in and/or shrinking, latching, welding, soldering, gluing or the like, connected to this in one embodiment to a groove, in particular annular groove, of the base body, in particular at least partially received therein.

Additionally or alternatively, in one embodiment, the second axial stop is configured integrally with the base body. In another embodiment, the second axial stop is manufactured separately from the base body and, is arranged, in particular non-destructively detachable or not non-destructive detachable, in particular axially and/or rotationally fixed and/or form-fitting, frictionally engaged and/or firmly bonded, in particular by plugging on or in and/or shrinking, latching, welding, soldering, gluing or the like, connected to this in one embodiment to a groove, in particular annular groove, of the base body, in particular at least partially received therein.

By a non-destructively detachable connection, in one embodiment, the (first or second) axial stop can be simplified reliably, more reliably, stably, more stably, precisely and/or more precisely fastened to the rod, in particular axially fixed, and/or an assembly. Due to an integral configuration, in one embodiment, the (first or second) axial stop may (still) be fastened reliably, more reliably, stably, more stably, precisely and/or more precisely to the rod, in particular axially fixed. An assembly/disassembly in particular can be simplified by a non-destructively detachable connection in one embodiment. The positioning of the respective axial stop and/or the strength of its connection to the base body can be improved in one embodiment, by a groove, by an annular groove, the production of the groove and/or the assembly.

In one embodiment, one or more, in particular at least the plurality of the, in particular all first rolling elements and/or one or more, in particular at least the plurality of the, in particular all second rolling elements are configured spherical and/or made of metal and/or respectively one or more of the first rolling elements and/or second rolling elements are guided in an axial passage opening closed on one or both sides, in particular a radial groove open on both sides, in particular an elongated slot passage opening, of the (first or second) cage.

Additionally or alternatively, in one embodiment, the first outer shell has at least one, in particular at least two (first) end stops axially opposite one another, (outer shell side, in particular outer shell fixed). At least the one end stop is fastened to the first outer shell in one embodiment or is configured integrally with it and/or an axial displacement of the first cage is configured in the first outer shell, in particular form-fitting, limited or is set up for that purpose or respectively, and/or is made of metal. Additionally or alternatively, in one embodiment, the second outer shell has at least one, in particular at least two second end stops axially opposite one another, (outer shell side, in particular outer shell fixed), wherein at least the one end stop is fastened to the second outer shell in one embodiment or is configured integrally with it and/or an axial displacement of the second cage is configured in the second outer shell, in particular form-fitting, limited or set up for that purpose or respectively, and/or is made of metal.

Additionally or alternatively, the first cage and/or the second cage are made of metal and/or plastic in one embodiment.

In this way, in one embodiment, in each case alone, but in particular in combination, the support of the rod relative to or in the first or second outer shell (or corresponding to the first or second outer shell relative to or on the rod) can be improved and/or a service life of the first or second rolling bearing can be increased.

In one embodiment, the (first) axial stop can pass axially reversibly the (first) end stop or at least one, in particular closer to it, of the (first) end stops or the (first) axial stop and this (first) end stop are configured accordingly for this purpose, in particular (geometrically) matched to each other, in particular dimensioned such or accordingly. In one embodiment, an outer contour of the (first) axial stop is smaller than an (inner) contour of a passage opening of the (first) end stop or at least one, in particular closer to it, of the (first) end stops or at least this (first) end stop has a passage opening, through which the (first) axial stop can be fed through, in particular can be pushed through. Additionally or alternatively, in one embodiment, the second axial stop can pass the second end stop or at least one, in particular closer to it, of the second end stops axially reversibly or the second axial stop and this second end stop are configured for this purpose or correspondingly, in particular (geometrically) matched to each other, in particular dimensioned such or accordingly. In one embodiment, an outer contour of the second axial stop is smaller than an (inner) contour of a passage opening of the second end stop or at least one, in particular closer to it, of the second end stops or at least this second end stop has a passage opening, through which the second axial stop can be fed through, in particular can be pushed through.

As a result, in one embodiment, a stroke path of the rod advantageously can be increased and/or the (first or second) cage can be secured against loss or its displacement can be limited.

In one embodiment, the (first) axial stop is configured annular or has the shape of a closed or unslotted ring along its circumference. In another embodiment, the (first) axial stop is configured partially annular or has the shape of a (radial) slotted ring. Additionally or alternatively, in one embodiment, the second axial stop is configured annular or has the shape of a closed or unslotted ring along its circumference. In another embodiment, the second axial stop is configured partially annular or has the shape of a (radial) slotted ring.

The form-fitting securing can be improved in one embodiment by an annular (first or second) axial stop, by a partially annular (first or second) axial stop in one embodiment, the assembly/disassembly.

In one embodiment, the (first) outer shell is non-destructively detachable, in particular frictionally engaged and/or form-fitting, in particular by pressing in, or not non-destructively detachable, in particular form-fitting and/or firmly bonded fastened on, in particular at least partially in, a component, in particular the shift cylinder, or is set up for this purpose or is used for this purpose. Additionally or alternatively, in one embodiment, the second outer shell is non-destructively detachable, in particular frictionally engaged and/or form-fitting, in particular by pressing in, or not non-destructive detachable, in particular form-fitting and/or firmly bonded fastened on, in particular at least partially in, a component, in particular the switch cylinder, or is set up for this purpose or is used for this purpose. Additionally or alternatively, the shift cylinder, in one embodiment, has one or more, in particular axially spaced from each other, shift fingers, for actuating shift forks for switching, in particular engaging and/or disengaging gears, of the manual transmission.

Additionally or alternatively, in one embodiment, the switch axis includes an angle with a vehicle vertical axis of the motor vehicle which is at most 45°, in particular at most 30°, in particular at most 15°.

In such applications, the present disclosure may be used to particular advantage in one embodiment, but is not limited thereto. Accordingly, a rolling bearing arrangement described here in one embodiment, otherwise, in particular elsewhere in a motor vehicle, in particular passenger cars, in particular in its manual transmission and/or for the support of rotational and axial, in particular limited, displaceable, axles or shafts, can be used.

For the (at least partial) assembly of a rolling bearing arrangement described here, according to an embodiment of the present disclosure, the rod, in particular its base body, with the (first) axial stop configured integral with the base body, is rotatably and axially displaceably supported by the (first) rolling elements, in particular is inserted, in particular, slid in, into this.

According to another embodiment of the present disclosure, the (first) separately manufactured axial stop of the rod is connected to the base body for the (at least partial) assembly of a rolling bearing arrangement described here, in particular the annular, (first) axial stop is axially slid onto the base body or the, in particular slotted or partially annular, (first) axial stop is slid radially onto the base body before the base body or rod then rotatably and axially displaceably supported by the (first) rolling elements, in particular is inserted into this, in particular, slid in.

According to another embodiment of the present disclosure, the (first) separately manufactured axial stop of the rod is connected to the base body for the (at least partial) assembly of a rolling bearing arrangement described here, in particular the, in particular annular, (first) axial stop is axially slid onto the base body or the, in particular slotted or partially annular, (first) axial stop is slid radially onto the base body after which the base body or rod has been already rotatably and axially displaceably supported by the (first) rolling elements, in particular has been inserted into this, in particular, has been slid in.

In one embodiment, the rod, in particular its base body, is rotatably and axially displaceably supported with the second axial stop configured integrally with the base body by the second rolling elements, in particular is inserted into this, in particular slid in.

In another embodiment, the separately manufactured second axial stop of the rod is connected to the base body, in particular the, in particular annular, second axial stop is slid axially onto the base body or the, in particular slotted or partially annular, second axial stop slid radially onto the base body, before the base body or rod is then rotatably and axially displaceably supported by the second rolling elements, in particular is inserted into this, in particular, slid in.

In another embodiment, the separately manufactured second axial stop of the rod is connected to the base body, in particular the, in particular annular, second axial stop is slid axially onto the base body or the, in particular slotted or partially annular, second axial stop is slid radially onto the base body, after the base body or rod has been already rotatably and axially displaceably supported by the second rolling elements, in particular is inserted into this, in particular, slid in.

In this case, in one embodiment, the first axial stop can be configured integrally with the base body and the second axial stop can be separately manufactured and connected to this (before or after supporting of the rod by the second rolling elements), in particular slid on axially or radially. Similarly, in another embodiment, the second axial stop can be configured integrally with the base body and the first axial stop can be made separately and (before or after support of the rod by the first rolling elements) connected to this, in particular slid on axially or radially. Similarly, in another embodiment, the first and the second axial stop can be integrally configured with the base body or the first and the second axial stop can be manufactured separately and connected to this, in particular axially or radially slid on, in particular before or after supporting of the rod by the first rolling elements and before or after supporting of the rod by the second rolling elements.

By an axial sliding on, in one embodiment, the assembly can be simplified and/or the fastening of the respective axial stop onto the base body can be improved by an integral configuration in one embodiment, the strength of the respective axial stop (second) can be improved. By a radial sliding on, in one embodiment, the respective axial stop can be advantageously assembled between (the) two rolling bearings. In addition, other objects, desirable features and characteristics will become apparent from the subsequent summary and detailed description, and the appended claims, taken in conjunction with the accompanying drawings and this background.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
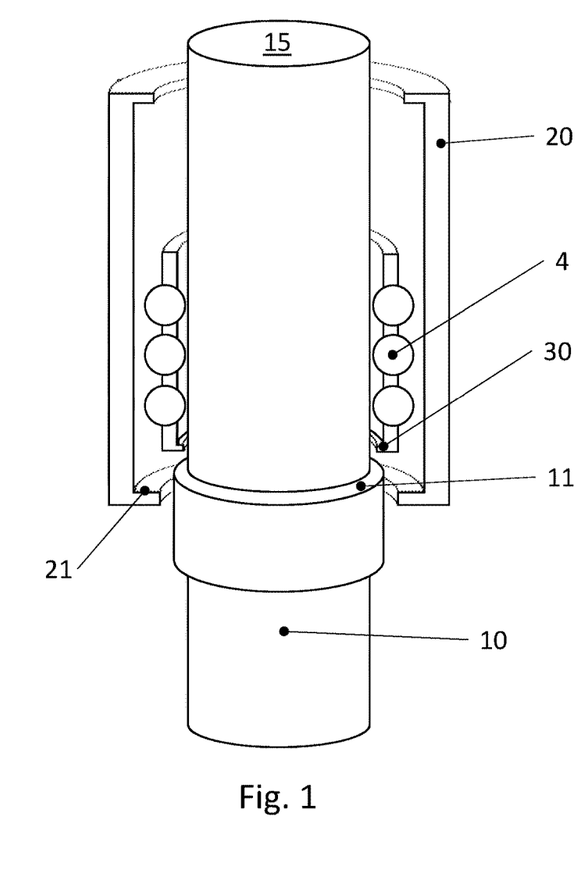
FIG. 1 illustrates a rolling bearing arrangement according to an embodiment of the present disclosure in a perspective half section.

FIG. 1 shows a rolling bearing arrangement according to an embodiment of the present disclosure in a perspective half section. A rolling bearing can be seen, which has an outer shell 20, a cage 30 which is arranged axially displaceable in the outer shell 20, and a plurality of rolling elements 4 radially supported on the outer shell 20, guided by the cage 30, and a rod 10, which is rotatably and axially displaceably supported by the rolling elements 4. The rod 10 has an axial stop 11 which secures in a form-fitting manner the cage 30 with vertically aligned rod 10 in an upper position against an axial displacement downwards, as described below with reference to FIGS. 7-9 explained in more detail.

In the embodiment of FIG. 1, the axial stop 11 is integrally configured with a cylindrical base body 15 of the rod 10.

Figure 2:
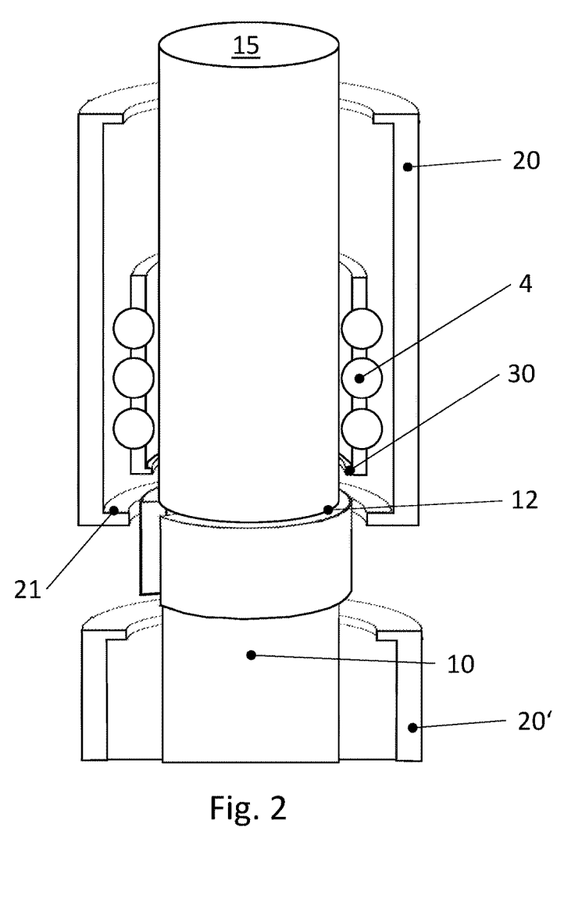
FIG. 2 illustrates a rolling bearing arrangement according to a further embodiment of the present disclosure in FIG. 1 corresponding representation.

FIG. 2 shows a representation of a rolling bearing arrangement corresponding to FIG. 1 and a further embodiment of the present disclosure. Corresponding features are identified by identical reference numerals, so that reference is made to the description of the embodiment of FIG. 1 and only differences are discussed in the following. In the embodiment of FIG. 2, the partially annular axial stop 12 is manufactured separately and slid radially onto the base body 15 and connected to it, for example, by snapping into a groove 16 (see FIG. 6).

In addition, the rolling bearing arrangement of FIG. 2 except the one (first) rolling bearing with outer shell 20, cage 30 and rolling elements 4, has a second rolling bearing, which corresponds to this first rolling bearing and of which, in FIG. 2, only its outer shell 20' is recognizable.

Figure 3:
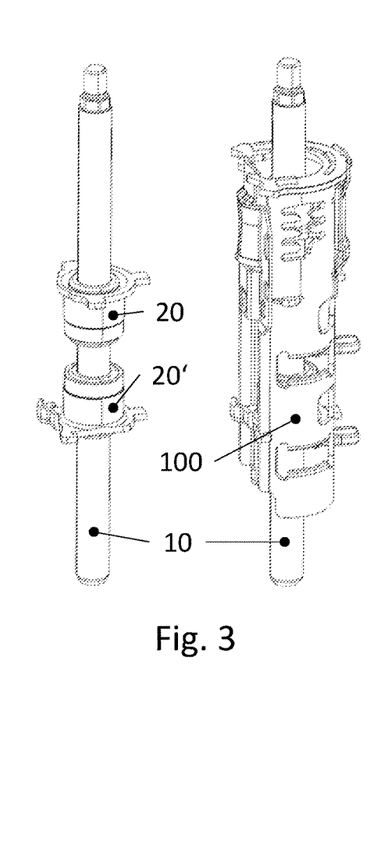
FIG. 3 illustrates a switching device having a rolling bearing arrangement according to an embodiment of the present disclosure in an expanded perspective view.

FIG. 3 shows right a switching device for switching a (motor vehicle) manual transmission having the rolling bearing arrangement of FIG. 2 and a shift or blocker cylinder 100, which is supported rotatably and axially displaceably on the rod of the rolling bearing arrangement in the form of a switch axis 10 of the switching device by the rolling elements 4 and the second rolling elements 4' of this rolling bearing arrangement or its first and second rolling bearings (see also FIGS. 7-9) and left the same switching device having hidden shift or blocker cylinder 100. The shift or blocker cylinder 100 is axially displaced on the switch axis 10 to select different gears and shifting gates, and rotated about the switch axis 10 to engage or disengage selected gears.

Figure 4:
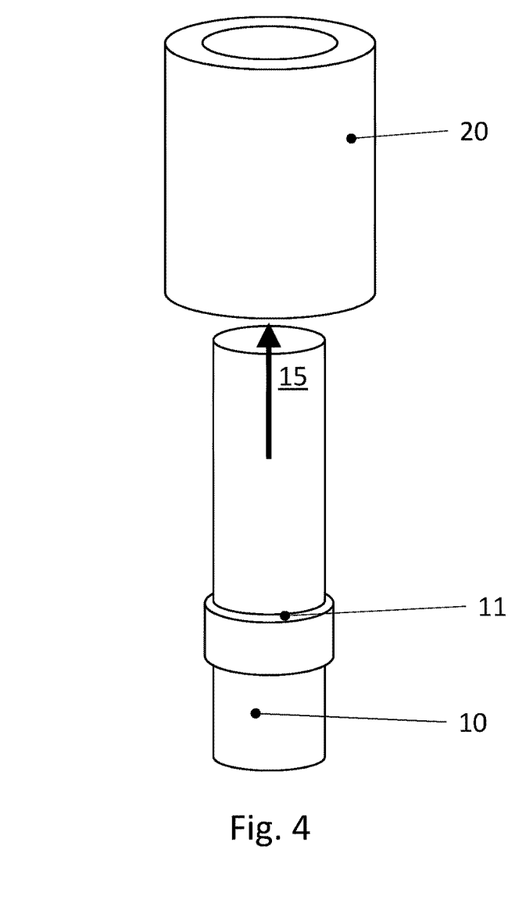
FIG. 4 illustrates an assembly of a rolling bearing arrangement according to an embodiment of the present disclosure.

FIG. 4 shows an assembly of the rolling bearing arrangement of FIG. 1 according to an embodiment of the present disclosure. As indicated by the assembly arrow, the rod 10 with the axial stop 11 configured integrally with the base body 15 is slid into the rolling elements 4 (see FIG. 1) and is thereby supported rotatably and axially displaceably.

Figure 5:
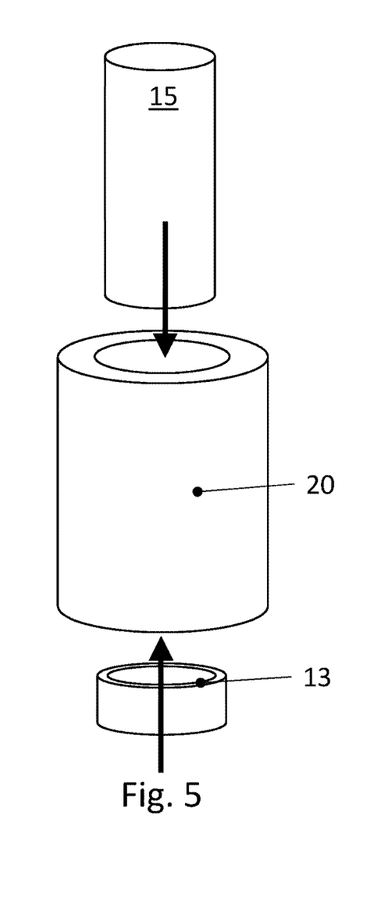
FIG. 5 illustrates an assembly of a rolling bearing arrangement according to a further embodiment of the present disclosure.

FIG. 5 shows in FIG. 4 corresponding representation of an assembly of a rolling bearing arrangement according to a further embodiment of the present disclosure. Corresponding features are identified by identical reference numerals, so that reference is made to the previous description and only differences are discussed below.

In the embodiment of FIG. 5, as indicated by the assembly arrows, first the base body 15 is slid into the rolling elements 4 (see FIGS. 1, 2) and is thereby supported rotatably and axially displaceably. Subsequently, the separately manufactured, annular axial stop 13 is axially slid onto the base body 15 and connected to it, for example, by shrinking on or shrinking in, latching, welding, soldering, gluing or the like.

Figure 6:
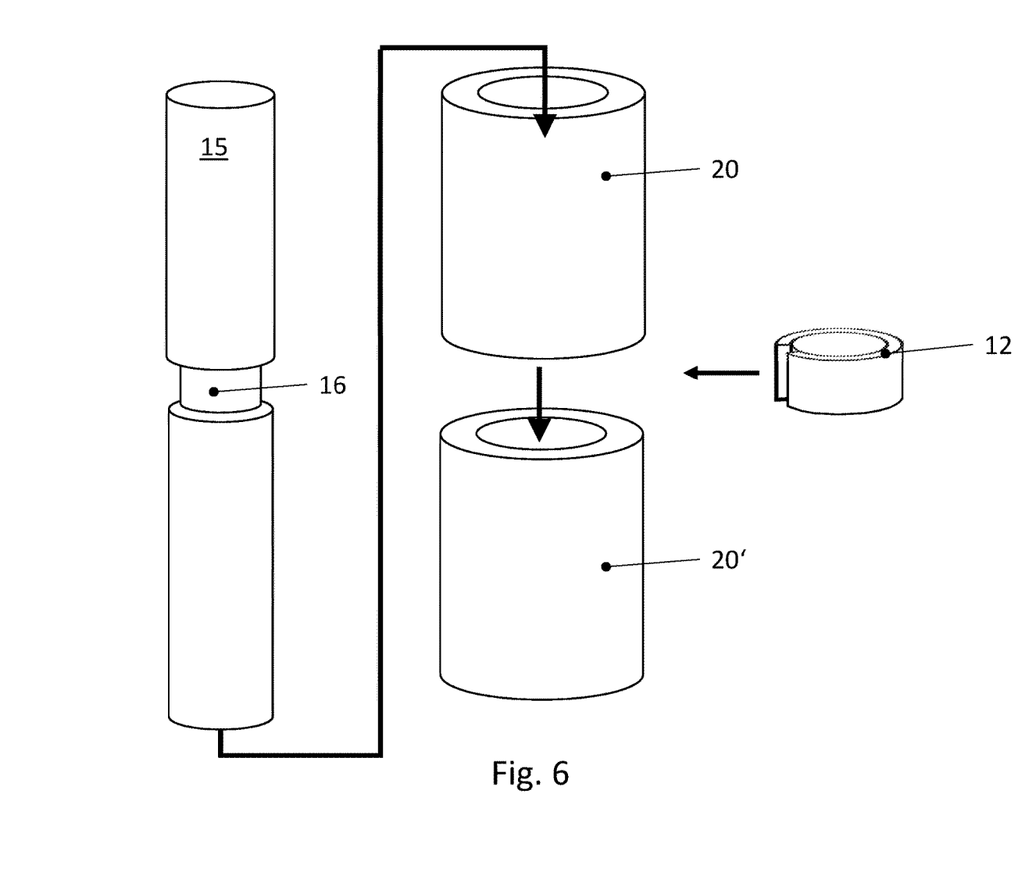
FIG. 6 illustrates an assembly of a rolling bearing arrangement according to a further embodiment of the present disclosure in an expanded view.

FIG. 6 shows assembly of the rolling bearing arrangement of FIG. 2 according to an embodiment of the present disclosure. As indicated by the assembly arrows, the base body 15 is slid into the rolling elements 4, 4' (see FIGS. 2, 7-9) and is thereby supported rotatably and axially displaceably. Subsequently, the separately manufactured, annular axial stop 12 is axially slid onto the base body 15 and connected to it, for example, by shrinking on or shrinking in, latching, welding, soldering, gluing or the like. A further separately manufactured, annular axial stop 13' (see FIGS. 7-9) is axially slid onto the base body 15 and connected to it, for example, by shrinking on or shrinking in, latching, welding, soldering, gluing or the like, such as explained with reference to FIG. 5 and therefore not shown here.

Figure 7:
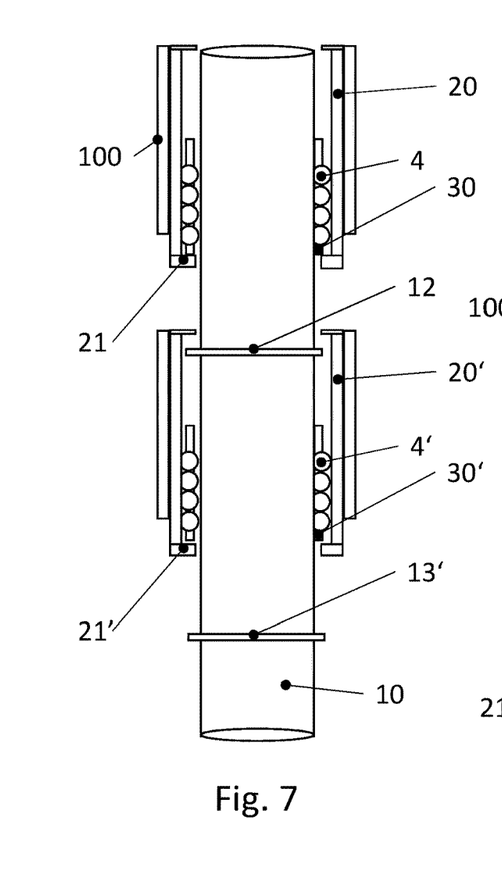
FIG. 7 illustrates a rolling bearing arrangement according to an embodiment of the present disclosure with a rod in an axial position.
Figure 8:
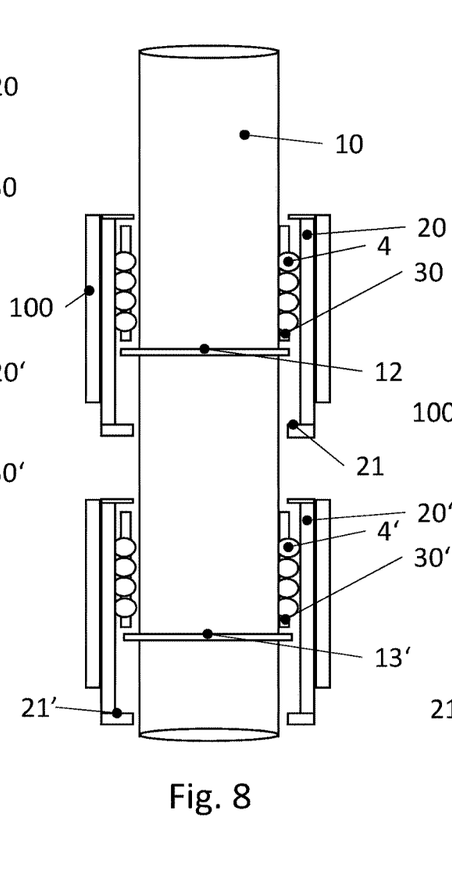
FIG. 8 shows the rolling bearing arrangement of FIG. 7 with the rod in another axial position.
Figure 9:
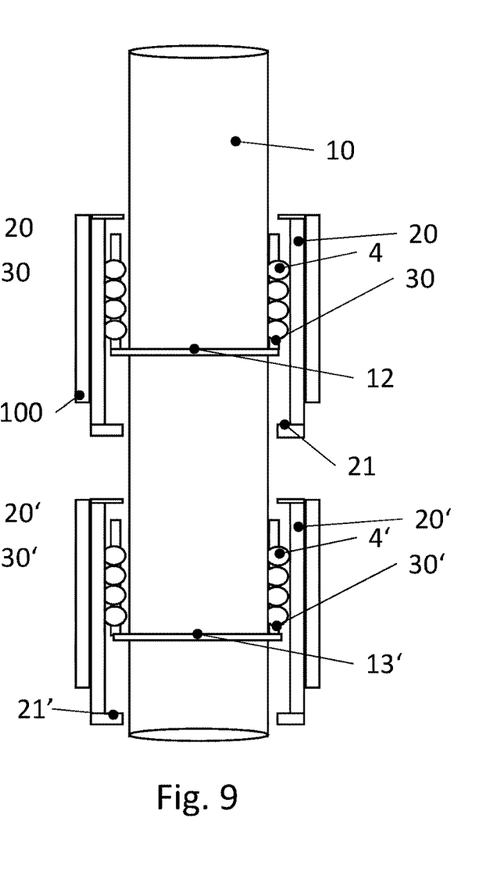
FIG. 9 shows the rolling bearing arrangement of FIG. 8 with cages that sit on stops of the rod.

FIGS. 7-9 illustrate a function of the rolling bearing arrangement of FIG. 2. In FIG. 7, the rod 10 is located relative to the outer shells 20, 20' of the two rolling bearings in a lower axial position or vice versa, the (outer shells 20, 20' of the) two rolling bearings or the shift or blocker cylinder 100 relative to the rod 10 in an upper axial position. This may correspond, for example, to a reverse gear path in a motor vehicle transmission.

In FIG. 8, conversely, the rod 10 is located relative to the outer shells 20, 20' of the two rolling bearings in an upper axial position or vice versa, the (outer shells 20, 20' of the)

two rolling bearings or the shift or blocker cylinder 100 relative to the rod 10 in a lower axial position. For a motor vehicle transmission, for example, this may correspond to a gear path of the highest gears, for example a fifth and possibly sixth (forward) gear.

By axial displacement of the shift or blocker cylinder 100 on the rod or the switch axis 10, this and analogous further, intermediate paths can thus be selected and in this, the appropriate gears may be engaged and disengaged by rotating the shift or blocking cylinder 100 on or around rod or switch axis 10. In particular as a result of this, but also due to vibrations, the cages 30, 30' in FIG. 8 could sag downwardly due to gravity if the axial stops 12, 13' were not present.

These axial stops 12, 13', however, form-fittingly secure the cages 30, 30' against such a downward axial displacement by seating the cages 30, 30' downwardly on the axial stops 12, 13' in an axial displacement due to gravity, as shown in FIG. 9.

The rolling bearing arrangement of FIG. 1 works analogously in that its integral axial stop 11 form-fittingly secures the cage 30 in an upper position against an axial displacement downward.

As can be seen in particular in FIGS. 1, 2 and schematically with reference to the sequence of FIGS. 7→8, the axial stops 11, 12, 13' can pass end stops 21 or 21' of the outer shells 20, 20', which, however, limit an axial displacement of the cages 30, 30', for example, due to correspondingly larger outer diameters of the cages 30, 30'.

Although exemplary embodiments have been explained in the foregoing description, it should be pointed out that a variety of modifications are possible.

For example, in the embodiment of FIGS. 2, 6-9, the second axial stop may also be configured in the form of a partial ring and/or be slid radially. If the base body 15 is slid in from below instead of from above in FIG. 6, the second axial stop can also be configured integrally as explained with reference to FIG. 1.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment as contemplated herein. It should be understood that various changes may be made in the function and arrangement of elements described in an exemplary embodiment without departing from the scope of the invention as set forth in the appended claims.

What is claimed is:

1. A rolling bearing arrangement in a switching device for switching a manual transmission, the roller bearing arrangement comprising:
   at least one rolling bearing having an outer shell, a cage axially displaceable in the outer shell and a plurality of rolling elements guided by the cage and radially supported on the outer shell; and
   a rod having a switch axis and supported rotatably and axially displaceably by the rolling elements, wherein the rod has a first axial stop for securing the cage in a form-fitting manner with the rod vertically aligned in an upper position against a downward axial displacement,
   wherein the outer shell comprises at least one end stop for limiting an axial displacement of the cage and the at least one end stop is configured to axially pass the first axial stop in a reversible manner.

2. The rolling bearing arrangement according to claim 1, further comprising at least one second rolling bearing having a second outer shell, a second cage axially displaceable in the second outer shell, and a plurality of second rolling elements guided by the second cage and radially supported on the second outer shell and rotatably and axially displaceably supporting the rod, wherein the rod has a second axial stop for the form-fitting securing of the second cage with the rod vertically aligned in the upper position against the downward axial displacement.

3. The rolling bearing arrangement according claim 1, wherein the rod comprises a base body with which the first axial stop is integrally configured.

4. The rolling bearing arrangement according to claim 1, wherein the rod comprises a base body having the first axial stop, which is the separately manufactured, is axially fixed thereto.

5. The rolling bearing arrangement according to claim 1, wherein at least one of the rolling elements comprises a spherical metal bearing.

6. The rolling bearing arrangement according to claim 1, wherein the first axial stop comprises an annular stop ring.

7. A switching device for switching a manual transmission of a motor vehicle manual transmission comprises at least one of the rolling bearing arrangement according to claim 1 and a shift cylinder supported by the rolling elements rotatably and axially displaceably on the switch axis of the rolling bearing arrangement.

8. A motor vehicle comprising a manual transmission having a switching device for switching the manual transmission having at least one of the rolling bearing arrangement according to claim 1.

9. A rolling bearing arrangement in a switching device for switching a manual transmission, the roller bearing arrangement comprising:
   a rod having a base body including a first portion and a second portion;
   a first axial stop disposed on the base body between the first and second portions;
   a second axial stop disposed on the base body at an end of the second portion opposite the first axial stop;
   a first rolling bearing disposed over the first portion of the base body, the first rolling bearing having a first cage retaining a plurality of first rolling elements and a first outer shell surrounding the first cage, wherein the first axial stop secures the first cage against axial displacement in a form-fitting manner with the rod vertically aligned in a first position;
   a second rolling bearing disposed over the second portion of the base body, the second rolling bearing having a second cage retaining a plurality of second rolling elements and a second outer shell surrounding the second cage, wherein the second axial stop secures the second cage against axial displacement in a form-fitting manner with the rod vertically aligned in the first position,
   wherein the first outer shell comprises an annular flange extending radially inward to form a first end stop, the first cage is captured between the first axial stop and the first end stop when the rod is in the first position, and the first end stop is configured to axially pass the first axial stop in a reversible manner.

10. The rolling bearing arrangement according to claim 9, wherein the second outer shell comprises an annular flange extending radially inward to form a second end stop, wherein the second cage is captured between the second axial stop and the second end stop when the rod is in the first position.

11. The rolling bearing arrangement according to claim 10, wherein the first end stop is configured to axially pass the first axial stop in a reversible manner.

* * * * *